United States Patent [19]

Suzuki et al.

[11] Patent Number: 4,892,395
[45] Date of Patent: Jan. 9, 1990

[54] COLLIMATING OPTICAL SYSTEM USING A SPHERICAL LENS

[75] Inventors: Masayuki Suzuki, Atsugi; Noritaka Mochizuki, Yokohama, both of Japan

[73] Assignee: Canon Kabushiki Kaisha, Tokyo, Japan

[21] Appl. No.: 149,019

[22] Filed: Jan. 27, 1988

[30] Foreign Application Priority Data

Jan. 30, 1987 [JP] Japan ................... 62-19916

[51] Int. Cl.$^4$ .............................................. G02B 3/00
[52] U.S. Cl. ................................................. 350/416
[58] Field of Search ........................... 350/416, 320

[56] References Cited

U.S. PATENT DOCUMENTS

1,881,588 10/1932 Horni ............................ 350/416
4,557,566 12/1985 Kikuchi et al. ................. 350/416

FOREIGN PATENT DOCUMENTS

0077405 5/1984 Japan ............................ 350/416

*Primary Examiner*—Bruce Y. Arnold
*Assistant Examiner*—Rebecca D. Gass
*Attorney, Agent, or Firm*—Fitzpatrick, Cella, Harper & Scinto

[57] ABSTRACT

A collimating optical system for collimating a diverging light beam through a spherical lens meets the following relation:

$$\left| \frac{l_{opt}}{f} - \frac{2-n}{n} + 0.05 \times \frac{3n - 1 - n^2}{(n-1)^2} (NA)^2 \right| < \frac{4 \times 10^{-4}}{(NA)^2}$$

$$0 < NA < 0.3$$

where n is refractive index of the lens, f is a focal distance, NA is the numerical aperture, and lopt is a spacing between an origin point of the diversing light beam and an end surface of the spherical lens.

In accordance with another aspect of the present invention, a collimating optical system for collimating the diverging light beam has a plane-parallel plate and a spherical lens arranged in this order following to an origin point of the diverging light beam and meets the following relation.

$$\left| \frac{l_{opt}}{f} - \frac{2-n}{n} - \frac{t}{f}\left(1 - \frac{1}{n_t}\right) + 0.05 \times \frac{3n - 1 - n^2}{(n-1)^2} (NA)^2 \right| < \frac{4 \times 10^{-4}}{(NA)^2}$$

$$0 < NA < 0.3$$

where n is a refractive index of the spherical lens, f is a focal distance, NA is the numerical aperture, nt is a refractive index of the plane-parallel plate, t is a thickness thereof, and lopt is a spacing between the origin point of diverging light beam and an end surface of the spherical lens.

27 Claims, 3 Drawing Sheets

COLLIMATING OPTICAL SYSTEM USING A SPHERICAL LENS

BACKGROUND OF THE INVENTION

1. Field of the Invention

The present invention relates to a collimating optical system for collimating a diversing light beam emitted from a light source such as semiconductor laser or LD, and more particularly to a high performance collimating optical system which uses a spherical lens.

2. Related Background Art

In a precision equipment such as a laser beam printer, a collimating optical system for collimating a laser beam emitted from a laser is used.

In such a collimating optical system, since it is necessary to limit a wavefront aberration to less than a quarter of wavelength, a plurality of lenses are usually used or a non-spherical lens is used to attain a desired performance.

However, since the collimating optical system comprising a plurality of lenses imposes severe requirements for glass work and assembly precision, manufacturing and adjustment times are long and mass-productivity is not high.

In the collimating optical system which uses the non-spherical lens, a desired performance may be attained by a single lens but a non-spherical plane precision is severe and non-spherical polishing and non-spherical molds are difficult to attain. Further, a yield in mass production is not high.

SUMMARY OF THE INVENTION

It is an object of the present invention to provide a collimating optical system which can compensate for a wavefront aberration and has a high mass productivity.

In order to achieve the above object, the collimating optical system of the present invention for collimating a diverging light beam through a spherical lens meets the following relation:

$$\left| \frac{lopt}{f} - \frac{2-n}{n} + 0.05 \times \frac{3n - 1 - n^2}{(n-1)^2} (NA)^2 \right| < \frac{4 \times 10^{-4}}{(NA)^2}$$

$$0 < NA < 0.3$$

where n is a refractive index of the lens, f is a focal distance, NA is the numerical aperture, and lopt is a spacing between an origin point of the diverging light beam and an end surface of the spherical lens.

In accordance with another aspect of the present invention, the collimating optical system for collimating the diverging light beam has a plane-parallel plate and a spherical lens arranged in the order following to an origin point of the diverging light beam and meets the following relation:

$$\left| \frac{lopt}{f} - \frac{2-n}{n} - \frac{t}{f}\left(1 - \frac{1}{n_t}\right) + 0.05 \times \frac{3n - 1 - n^2}{(n-1)^2} (NA)^2 \right| < \frac{4 \times 10^{-4}}{(NA)^2}$$

$$0 < NA < 0.3$$

where n is a refractive index of the spherical lens, f is a focal distance, NA is a numerical aperture, $n_t$ is a refractive index of the plane-parallel plate, t is a thickness thereof, and lopt is a spacing between the origin point of diverging light beam and an end surface of the spherical lens.

In accordance with the present invention, the collimating optical lens having a desired characteristic is provided with a very simple construction by the above features.

An outer shape of the spherical lens used in the present invention need not necessarily be a sphere, a lens having a common center of curvatures of two convex planes to which a light beam is applied is called the spherical lens. Accordingly, a spherical lens having a shingle may be used.

A specific construction and further features of the present invention will be apparent from the description of the embodiments.

DETAILED DESCRIPTION OF THE PREFERRED EMBODIMENTS

Figure 1:
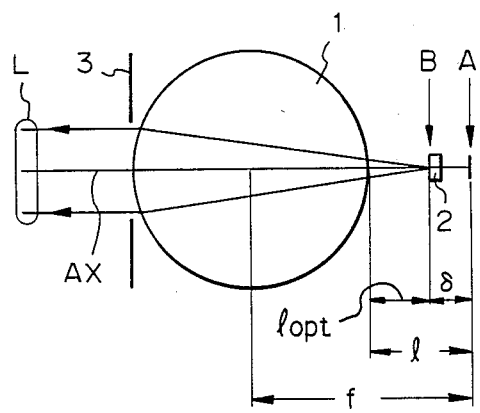
FIG. 1 is a sectional view of one embodiment of a collimating optical system of the present invention.

FIG. 1 shows a sectional view of one embodiment of the collimating optical system of the present invention.

In FIG. 1, numeral 1 denotes a spherical lens made of a homogeneous medium, numeral 2 denotes a light source, numeral 3 denotes an iris, f denotes a focal distance of the spherical lens 1, A denotes a focal point A of the spherical lens 1 determined by the focal distance f, B denotes an optimum position of the light source 2, l represents a distance along an optical axis from an end surface of the spherical lens 1 facing the light source 2 to the point A, (opt represents a distance along the optical axis from the end surface of the spherical lens 1 facing the light source 2 to the point B, δ represents a deviation along the optical axis of the point B from the point A, L denotes a collimated light beam, and AX denotes the optical axis. The point B means a position of the light source which minimizes the wavefront aberration of the collimated light beam L.

The collimating optical system of the present embodiment meets the following relation;

$$\left| \frac{lopt}{f} - \frac{2-n}{n} + 0.05 \times \frac{3n - 1 - n^2}{(n-1)^2} (NA)^2 \right| < \quad (1a)$$

$$\frac{4 \times 10^{-4}}{(NA)^2}$$

$$0 < NA < 0.3 \quad (1b)$$

where n is a refractive index of the spherical lens 1 NA is the numerical aperture.

The collimating optical system of the present embodiment comprises only two optical elements, the spherical lens 1 and the iris 3, as shown in FIG. 1 and the spherical lens 1 is the sole lens.

The iris 3 is arranged near the light emitting end surface of the spherical lens 1 and it essentially determines the NA of the optical system. The aberration can be controlled by the iris 3. The iris 3 is not an absolutely necessary element but may be used in accordance with a diverging angle of a diverging light beam emitted from the light source 2 and a specification of the optical system.

The shape of the spherical lens 1 other than the light beam input and output planes need not be spherical but it may be of any shape to facilitate mounting when the optical system is assembled into the device, so long as it has a substantially common center of curvatures of the light beam input/output planes a substantially common radius of curvatures thereof.

In the collimating optical system shown in FIG. 1, a radius r of curvature of the spherical lens 1 and a distance l (lens back) between the point A and the spherical lens 1 are given by;

$$r = \frac{2(n-1)}{n} \cdot f \quad (2)$$

$$l = \frac{2-n}{n} \cdot f \quad (3)$$

For example, when the focal distance f is equal to 4.5 mm, then $$r = 9.0 \times \frac{n-1}{n} \text{ (mm)} \quad (2')$$

$$l = 4.5 \times \frac{2-n}{n} \text{ (mm)} \quad (3')$$

Figure 2:
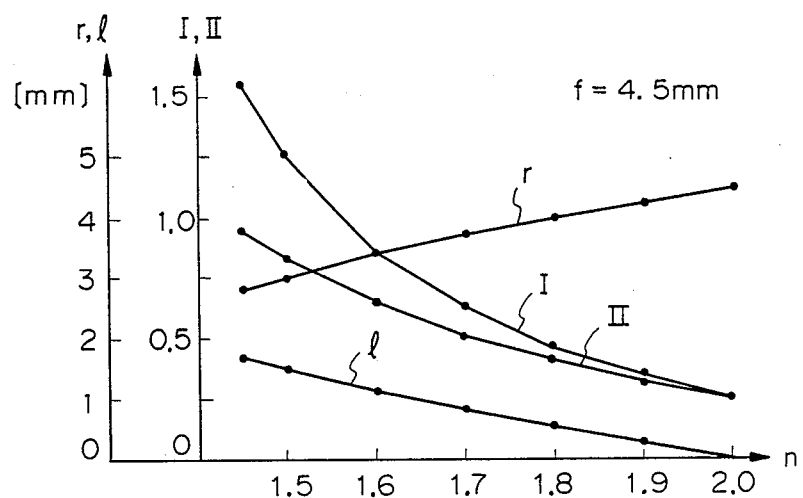
FIG. 2 is a graph showing a radius of curvature r of a spherical lens in the optical system of FIG. 1, a distance l between the lens and a focal point, and aberration coefficients I and II, as a function of a refractive index n of the spherical lens.

Thus, r and l are functions of only the refractive index n of the spherical lens 1. The values of r and l are shown in FIG. 2, where an abscissa represents the refractive index n and an ordinate represents r and l.

The aberration of the spherical lens 1 shown in FIG. 1 is now explained.

In an actual use, the diverging light is emitted from the light emitting point of the light source 2, passes through the spherical lens 1 and is emitted as a collimated light beam L. For a convenience of calculation, the aberration is determined on the assumption that the collimated light beam L from an object at an infinite point on the left of FIG. 1 is directed to the spherical lens 1 and focused onto a predetermined image plane.

When the focal distance is normalized (f=1) and the point A is used as the image plane, a third-order aberration coefficient of the aberration of the spherical lens 1 is represented by a function of only the refractive index n. (For the third-order aberration coefficient, reference is made to "Lens Design Method" by Y. Matsui, published by Kyoritsu Shuppan.)

$$\text{Spherical aberration coefficient } I = \frac{3n - 1 - n^2}{4(n-1)^2} \quad (4)$$

$$\text{Coma aberration coefficient } II = \frac{3n - 1 - n^2}{2n(n-1)} \quad (5)$$

Relations between the aberration coefficients I and II to n are shown in FIG. 2, as are done for r and l.

As seen from FIG. 2, the higher the refractive index n is, the smaller is the aberration and the smaller is the lens back l. When the refractive index n=2.0, the lens back l=0 and the image is focused onto the end surface.

Assuming that f=4.5 mm and NA=0.2, a lateral aberration Δy contributed by the spherical aberration coefficient I is given by:

$$\Delta y = 0.018 \times I \text{(mm)} \quad (6)$$

From the formula (6), it is seen that when n=2.0, Δy=4.5μm, and when n=1.5, Δy=22.5 μm. Thus, when the light source 2 is positioned at the point A, the aberration is large if n is small.

Accordingly, in the actual use, the light source 2 should be deviated from the focal point A to a position which assures a small aberration.

Based on the above consideration, the inventors of the present invention designed spherical lenses having various refractive indexes under focal distance f=4.5 mm, number of aperture NA=0.2, and wavelength λ=780 nm. Examples are shown in Table 1.

In Table 1, lopt represents a distance between the lens and the light source which minimizes the wavefront aberration, δ represents a deviation of the position of the light source from the focal point A of the spherical lens, WA represents a maximum wavefront aberration on the axis, l represents the distance from the end surface of the spherical lens to the focal point A, and I and II represent the spherical aberration coefficient and coma aberration coefficient given by the formulas (4) and (5). The value of the left term of the formula (1) which is the characteristic of the present invention is also shown. It will be readily understood that lopt, δ and l meet a relation:

TABLE 1

| | | | f = 4.5 mm, NA = 0.2, λ = 780 nm | | | | | | |
|---|---|---|---|---|---|---|---|---|---|
| Example | n | r (mm) | lopt (mm) | δ (μm) | WA (λ) | l (mm) | I | II | Left term of formula (1a) |
| 1 | 1.45 | 2.793 | 1.646 | 61. | 0.35 | 1.707 | 1.54 | 0.96 | 0.0012 |
| 2 | 1.50 | 3.000 | 1.450 | 50. | 0.29 | 1.500 | 1.25 | 0.83 | 0.0011 |
| 3 | 1.60 | 3.375 | 1.091 | 34. | 0.20 | 1.125 | 0.86 | 0.65 | 0.0007 |
| 4 | 1.70 | 3.706 | 0.769 | 25. | 0.15 | 0.794 | 0.62 | 0.51 | 0.0006 |
| 5 | 1.80 | 4.000 | 0.482 | 18. | 0.11 | 0.500 | 0.45 | 0.40 | 0.0004 |
| 6 | 1.90 | 4.263 | 0.223 | 14. | 0.08 | 0.237 | 0.34 | 0.32 | 0.0004 |
| 7 | 2.00 | 4.500 | (−0.010) | (10.) | (0.06) | 0 | 0.25 | 0.25 | 0.0002 |
| | | | 0 | 0. | 0.30 | | | | 0.0020 |
| 8 | 1.995 | 4.500 | 0 | 11. | 0.08 | 0.011 | 0.25 | 0.25 | 0.0005 |
| 9 | 1.81951 | 4.091 | 0.433 | 17. | 0.09 | 0.450 | 0.43 | 0.38 | 0.0004 |

Right term of formula (1a) = 0.01

$$l = l_{opt} + \delta \quad (7)$$

The values in the parentheses of the Example 7 (n=2.0) in Table 1 show those for the calculated optimum light source position, but it is not practical because lopt is negative. In actuality, therefore, the light source must be arranged on the end surface of the spherical lens. Values for such a case are shown below the values in the parentheses.

It is seen from Table 1 that the optimum refractive index of the spherical lens when the light source is used in contact to the lens end surface is n≈1.995, which corresponds to the Example 8.

When the light source 2 is a semiconductor laser, it may be difficult to put the light source in contact to the lens end surface. In such a case, a spherical lens having a relatively high refractive index like the Example 5, 6 or 9 may be used with the light source being slightly spaced from the spherical lens. The Examples 5-6 and 9 are suitable when the spherical lens and the semiconductor laser are integrally constructed.

In the present invention, an experimental formula for representing a deviation δ of the light source from the focal point is defined as follows.

$$\delta = 0.0555 \times \frac{3n - 1 - n^2}{(n-1)^2} (NA)^2 \cdot f = 0.222 \cdot I \cdot (NA)^2 \cdot f \quad (8)$$

The above formula is based on the assumption that the deviation δ is proportional to the spherical aberration coefficient I.

In the Examples of Table 1, the wavefront aberration occurs at a rate of approximately 0.25μ as the position of the light source moves by 10 μm along the optical axis from the optimum point shown by the deviation δ.

Figure 3:
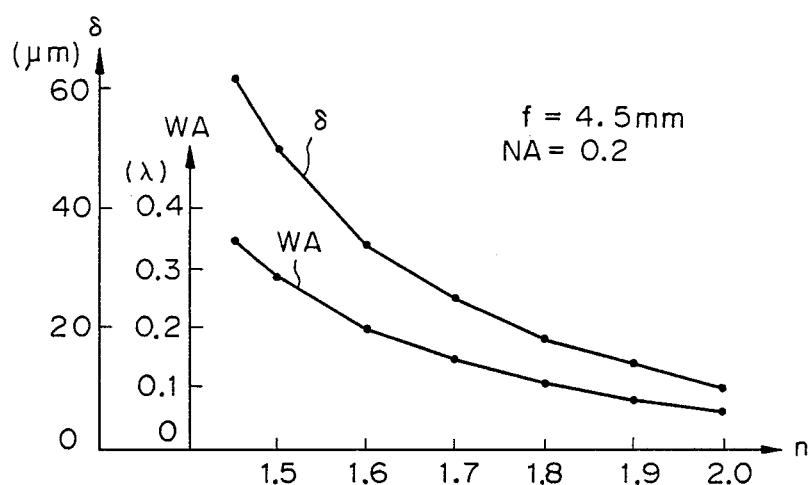
FIG. 3 is a graph showing an optimum light source position B of the optical system of FIG. 1 and a wavefront aberration W, as a function of the refractive index n of the spherical lens.

FIG. 3 is a graph showing the deviation δ of the light source from the focal point in the optical system shown in FIG. 1 and the wavefront aberration WA, as a function of the refractive index n of the spherical lens.

The calculation has been made based on the assumption that the focal distance of the optical system is f=4.5 mm and the numerical of aperture is NA=0.2.

It is seen from FIG. 3 that the larger the refractive index n of the spherical lens is, the smaller can be the wavefront aberration, and the larger the refractive index n of the spherical lens 1 is, the smaller should be the deviation δ.

The formula (1a) defines a condition to minimize the aberration when the collimating optical system is constructed by the spherical lens, by making use of the results of the above experiment.

Thus, if the range of the formula (1a) is exceeded, the aberration is large and the system is hardly usable as a collimating optical system. Needless to say, the closer to zero the value of the left term of the formula (1a), the smaller is the aberration, but if the values are within the range of the formula (1a), they may be practically used.

The formula (1b) defines the range of the number of aperture NA suitable for the present optical system. If the values exceed the range, a residual aberration increases and the system is hardly usable in a collimating optical system.

In order to collimate the light emitted from the semiconductor laser, it is necessary that the distance lopt between the light source (light emitting point) and the lens is large. Accordingly, a spherical lens having a low refractive index is required. In Table 1, the spherical lenses of the smaller-numbered Examples are preferable.

The specific embodiment of the present invention has been described in detail. While the collimating optical system is shown in the embodiment, the optical system of the present invention may be used as a focusing optical system which converts the collimated light beam to a converging light beam and focuses it onto a predetermined image plane. When it is used as the focusing optical system, a position spaced by δ from the focal point of the optical system is used as an image plane position. Thus, the collimated light beam can be focused to the predetermined position with the aberration being properly compensated.

In the semiconductor laser, a planar glass is usually used as the output plane of the laser beam. Accordingly, an effect thereof should be taken into account when the collimator system is designed.

In the following embodiment, a collimating optical system having a plane-parallel plate is described. The following embodiment provides a collimating optical system which permits compensation of aberration even when the distance between the light source and the lens is large.

Figure 4:
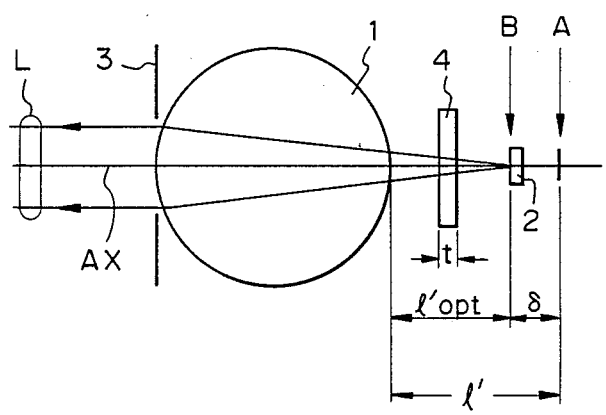
FIG. 4 is a sectional view of another embodiment of the collimating optical system of the present invention.

FIG. 4 shows a sectional view of the other embodiment of the collimating optical system of the present invention.

The like elements to those shown in FIG. 1 are designated by the like numerals and the explanation thereof is omitted. Numeral 4 denotes a plane-parallel plate having a thickness t and a refractive index $n_t$, which is arranged in a light path between the spherical lens 1 and the light source 2 with light beam input/output planes being perpendicular to the optical axis. Symbols l', l'opt and δ' represent spacings (distances) corresponding to l, lopt and δ of FIG. 1.

In the present embodiment, the plane-parallel plate 4 may be arranged at any position between the spherical lens 1 and the light source 2. The diverging light beam emitted from the light source 2 passes through the plane-parallel plate 4, the spherical lens 1 and the iris 3 and is collimated to a light beam L.

The collimating optical system of FIG. 4 meets a relation:

$$\left| \frac{l_{opt}}{f} - \frac{2-n}{n} - \frac{t}{f}\left(1 - \frac{1}{n_t}\right) + 0.05 \times \frac{3n - 1 - n^2}{(n-1)^2}(NA)^2 \right| < \frac{4 \times 10^{-4}}{(NA)^2} \quad (9a)$$

$$0 < NA < 0.3 \quad (9b)$$

The near-axis value and the aberration coefficient in the present embodiment are given by the following formulas.

First, a relation between a radius r of curvature of the spherical lens 1 and a focal distance f is given by the formulas (2) and (3) as is done in the embodiment of FIG. 1.

The distance l' between the end surface of the spherical lens 1 facing the light source 2 and the focal point A is given by $$l' = \frac{2-n}{n}f + t\left(1 - \frac{1}{n_t}\right) = l + t\left(1 - \frac{1}{n_t}\right) \quad (10)$$

Accordingly, the distance from the end surface of the spherical lens 1 and the focal point A is increased by $t(1-1/n_t)$ by the insertion of the plane-parallel plate into the collimating optical system. Specifically, when $t=0.3$ mm and $n_t=1.50$, the increment is 0.1 mm.

The spherical aberation coefficient I' and the coma aberation coefficient II' are normalized by the focal distance $f=1$ as follows.

Spherical aberration coefficient $I'=I-t/n_t$.
$(1-\frac{1}{2}n_t)$  (11)

Coma aberration coefficient $II'=II-n-2/n\cdot t/n_t$ $(1-\frac{1}{2}n_2)$  (12)

Second terms have been additionally included in the formulas (11) and (12) to compare with the formulas (4) and (5) for the embodiment where no plane-parallel plate 4 is inserted. The affect of the second terms is −0.025 for the spherical aberration and +0.008 for the coma aberation when $n_t=n=1.5$ and $t=0.3$ mm (or $t=0.0667$ when converted for $f=1$). Those are in the order of one tenth of I and II of the first terms. Accordingly, the aberrations are essentially not different from those for the no plane-parallel plate embodiment of FIG. 1. It is preferable to deviate the position of the light source 2 from the focal point A as is done in the embodiment of FIG. 1.

Numeric examples of the collimating optical system shown in FIG. 4 are shown in Table 2. The symbols and format of Table 2 are same as those of Table 1, except that lopt, δ and l in Table 1 are substituted by l'opt, δ' and l', respectively, and the values of the left terms of the formula (9) and the parameters of the plane-parallel plate are indicated.

A common specification of the collimating optical system shown in Table 2 is $f=4.5$ mm, NA$=0.2$, $\lambda=780$ nm, and $n_t = 1.51072$.

The deviation δ' between the position of the light source in the collimating optical system and the focal point is experimentarily given by $$\delta' = 0.209 \times I' \times (NA)^2 \cdot f \quad (13)$$

If the formula (4) is used as the spherical aberration coefficient, the deviation δ' is given by $$\delta' = 0.204 \times I \times (NA)^2 \cdot f = 0.0511 \times \frac{3n-1-n^2}{(n-1)^2} \times (NA)^2 \cdot f \quad (14)$$

Accordingly, whichever of the formulas (13) and (14) may be used, the deviation δ' in Table 2 can be substantially precisely expressed.

In the Examples of Table 2, the wavefront aberration occurs at a rate of approximately 0.25λ as the position of the light source is moved by 10 μm along the optical axis.

The formula (9a) defines a condition to minimize the aberration when the collimating optical system comprises the spherical lens and the plane-parallel plate and has NA of approximately 0–0.3.

If the value exceeds the range of the formula (9a), the aberration is large and the system is hardly usable as a collimating optical system.

The aberration is minimum when the left term is close to zero, as is the case for the formula (1a).

The formula (9b) defines a range of the numerical aperture NA suitable to the present optical system, as the formula (1b) does. When the value exceeds this range, a residual aberration is large and the optical system is hardly usable as a collimating optical system.

In the embodiments of FIGS. 1 and 4, one light source (or light emitting point) is used, although a plurality of light sources (or light emitting points) may be used. While the iris 3 is positioned on the light beam output plane of the spherical lens, it may be located at other positions on the optical axis.

The light source may be semiconductor laser, LED or gas laser.

The spherical lens and the plane-parallel plate may be made of glass or plastic.

The refractive index $n_t$ and the thickness t of the plane-parallel plate, the focal distance f and the numerical aperture NA of the spherical lens, and the wavelength λ of the light source are not limited to the values of the numerical examples but other values may be used.

Followings are examples in which the spherical lenses shown in the Example 2 of Table 1 and the Example 10 of Table 2, with the numerical aperture NA=0.1 are used.

Example 16

TABLE 2

| | f = 4.5 mm, NA = 0.2, λ = 780 nm, $n_t$ = 1.51072 | | | | | | | | |
|---|---|---|---|---|---|---|---|---|---|
| Example | n | r (mm) | t (mm) | l'opt (mm) | δ' (μm) | WA (λ) | l' (mm) | I' | II' | Left term of formula (9a) |
| 10 | 1.51072 | 3.040 | 0.200 | 1.480 | 44. | 0.24 | 1.524 | 1.18 | 0.82 | 0.0004 |
| 11 | 1.51072 | 3.040 | 0.300 | 1.514 | 44. | 0.24 | 1.558 | 1.17 | 0.82 | 0.0004 |
| 12 | 1.60910 | 3.400 | 0.200 | 1.128 | 31. | 0.17 | 1.159 | 0.82 | 0.64 | 0.0006 |
| 13 | 1.60910 | 3.400 | 0.300 | 1.162 | 30. | 0.17 | 1.192 | 0.81 | 0.64 | 0.0006 |
| 14 | 1.68443 | 3.660 | 0.200 | 0.887 | 24. | 0.13 | 0.911 | 0.63 | 0.53 | 0.0001 |
| 15 | 1.74411 | 3.840 | 0.200 | 0.708 | 20. | 0.11 | 0.728 | 0.52 | 0.46 | 0.0001 |

Right term of formula (9a) = 0.01

| f = 4.5 mm | NA = 0.1 | λ = 780 nm |
|---|---|---|
| n = 1.50 | r = 3.000 mm | lopt = 1.488 nm |
| δ = 12 μm | WA = 0.02 λ | l = 1.500 mm |

Example 17

| f = 4.5 mm | NA = 0.1 | λ = 780 nm |
|---|---|---|
| $n_t$ = 1.51072 | n = 1.51072 | r = 3.040 mm |
| t = 0.200 mm | l'opt = 1.512 mm | δ' = 12 μm |
| WA = 0.02 λ | l' = 1.524 | |

The residual aberration is considerably improved by using the reduced NA. The deviations $\delta$ and $\delta'$ from the near-axis position are approximately one quarter of those for NA=0.2, and the wavefront aberration which occurs as the position of the light source moves along the optical axis is 0.06$\lambda$ for the movement of 10$\mu$m, which is approximately one quarter of that for NA=0.2.

Figure 5:
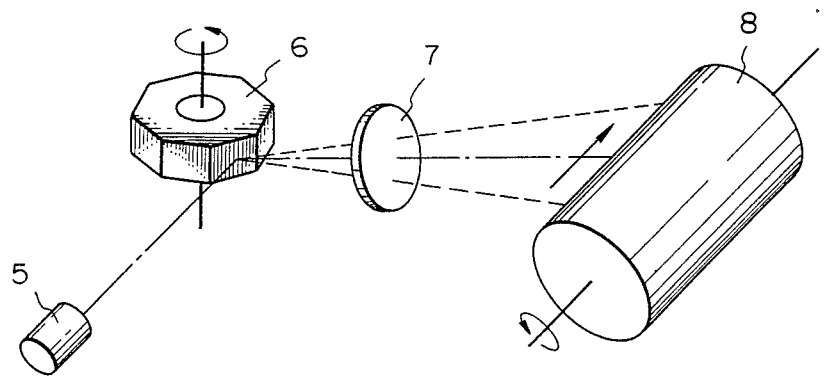
FIG. 5 shows an embodiment of a laser beam printer which uses the present collimating optical system.

FIG. 5 shows an embodiment of a laser beam printer constructed by using the present collimating optical lens.

In FIG. 5, numeral 5 denotes a collimating optical system having a semiconductor laser and the construction of FIG. 1 or 4, numeral 6 denotes a polygon mirror, numeral 7 denotes a f-$\theta$ lens, and numeral 8 denotes a photo-conductive drum. The laser beam emitted through the collimating optical system 5 is reflected by the polygon mirror, passes through the f-$\theta$ lens 7 and is focused onto the photo-conductive drum 8 as a spot. Since the polygon mirror 6 is rotated at a constant speed, the spot formed on the photo-conductive drum 8 by the f-$\theta$ lens 7 also moves on the drum at a constant speed so that image information can be recorded without distortion.

The scanning optical system from the polygon mirror 6 to the photo-conductive drum 8 of FIG. 5 is not limited to the illustrated system but any other scanning optical system such as a combination of a Galvano mirror and an arc sine lens. In the present embodiment, either one or more than one light source (multi-beam spot) may be used.

Since the collimating optical system of the present invention uses the spherical lens as a major element, the construction is simple and the manufacturing cost is low. By meeting the condition of the formula (1) or (9), the aberration is suppressed and the wide angle and high performance collimating optical system is provided.

The spherical lens can be manufactured with a high precision (precision of sphere diameter is less than 1 $\mu$m) and a low cost by a mass production system similar to that of a bearing ball unlike the manufacture and polishing of a conventional non-spherical lens.

Because of the spherical symmetry inherent to the spherical lens, there is no inclined eccentricity and the number of elements is reduced and mechanical parts such as a lens frame can be simplified. Accordingly, an assembly cost is reduced.

Further, because of the spherical symmetry of the spherical lens, the aberration is constant for the incident light applied in any direction. Accordingly, the present system may be effectively used as light emitting array or multi-beam optical system.

The spherical lens has many advantages as described above but it includes the aberration because it is a single lens made of homogeneous medium.

In the present invention, in order to solve the above problem, the collimating optical system is designed to meet the condition of the formula (1) or (9) so that it has a performance compatible with the collimating optical system which use the conventional non-spherical lens.

We claim:

1. A collimating optical system for collimating a diverging light beam, comprising:
   a lens element having a light input surface and a light output surface of essentially common center of curvature, and having a predetermined focal distance;
   an origin point of divergence of the diverging light beam being displaced from a focal point of said lens element determined by the focal distance, by a predetermined distance along an optical axis of the system;
   said lens element receiving the diverging light beam on the light input surface emitting a collimated light beam from the light output surface.

2. A collimating optical system according to claim 1 wherein said lens element meets a condition of $$0 < NA < 0.3$$

where NA is a numerical aperture of said lens element.

3. A collimating optical system according to claim 2 wherein said lens element meets a condition of $$\left| \frac{lopt}{f} - \frac{2-n}{n} + 0.05 \times \frac{3n-1-n^2}{(n-1)^2} (NA)^2 \right| < \frac{4 \times 10^{-4}}{(NA)^2}$$

where n is a refractive index of said lens element, f is a focal distance thereof, and lopt is a distance between the origin point of divergence and the light input surface.

4. A collimating optical system according to claim 2 further comprising a plane-parallel plate disposed in a light path between the light input surface and the origin point of divergence;
   said diverging light beam being applied to the light input surface through said plane-parallel plate.

5. A collimating optical system according to claim 4 wherein said lens element meets a condition of $$\left| \frac{lopt}{f} - \frac{2-n}{n} - \frac{t}{f}\left(1 - \frac{1}{n_t}\right) + 0.05 \times \frac{3n-1-n^2}{(n-1)^2}(NA)^2 \right| < \frac{4 \times 10^{-4}}{(NA)^2}$$

where n is a refractive index of said lens element, f is a focal distance thereof, lopt is a distance between the origin point of divergence and the light input surface and $n_t$ and t are refractive index and thickness of said plane-parallel plate.

6. A collimating optical system according to claim 1, wherein said lens element has a predetermined refractive index and is made of homogeneous medium.

7. A collimating optical system according to claim 6, wherein said lens element is made of a single lens.

8. A focusing optical system for focusing a collimated light beam on an image plate, comprising:
   a lens element having a light input surface and a light output surface of essentially common center of curvature, and having a predetermined focal distance;
   the position of the image plane being displaced from a focal point of said lens element determined by the focal distance, by a predetermined distance along an optical axis of the system,
   said lens element receiving the collimated light beam on the light input surface and emitting a converging light beam from the light output surface.

9. A focusing optical system according to claim 8 wherein said lens element meets a condition of $$0 < NA < 0.3$$

where NA is a numerical aperture of said lens element.

10. A collimating optical system for collimating a diverging light beam through a spherical lens, said spherical lens meeting a condition of $$\left| \frac{lopt}{f} - \frac{2-n}{n} + 0.05 \times \frac{3n-1-n^2}{(n-1)^2} (NA)^2 \right| < \frac{4 \times 10^{-4}}{(NA)^2}$$

$$0 < NA < 0.3$$

where n is a refractive index of said spherical lens, f is a focal distance thereof, NA is a numerical aperture thereof, and lopt is a distance between an origin point of divergence of the diverging light beam and an end surface of said spherical lens.

11. A collimating optical system for collimating a diverging light beam comprising:
   a plane-parallel plate and a spherical lens arranged in this order following to an origin point of divergence of the diverging light beam;
   said spherical lens meeting a condition of $$\left| \frac{lopt}{f} - \frac{2-n}{n} - \frac{t}{f}\left(1 - \frac{1}{n_t}\right) + 0.05 \times \frac{3n-1-n^2}{(n-1)^2} (NA)^2 \right| < \frac{4 \times 10^{-4}}{(NA)^2}$$

$$0 < NA < 0.3$$

where n is a refractive index of said spherical lens, f is a focal distance thereof, NA is a numerical aperture thereof, lopt is a distance between the origin point of divergence and an end surface of said spherical lens, $n_t$ is a refractive index of said plane-parallel plate, and t is a thickness thereof.

12. A method for collimating a diverging light beam comprising the steps of:
   supplying the diverging light beam; and
   arranging a lens having a predetermined focal distance to receive the diverging light beam;
   said lens having a light input surface and a light output surface of a common center of curvature, and receiving the diverging light beam on the light input surface and emitting a collimated light beam from the light output surface;
   an origin point of divergence of the diverging light beam being displaced from a focal point of said lens by a predetermined distance.

13. A method for collimating a diverging light beam according to claim 12 wherein said lens has a predetermined refractive index and is made of homogeneous medium.

14. A method according to claim 13, wherein said lens is made of a single lens.

15. A method for collimating a diverging light beam according to claim 12 wherein said lens meets a condition of $$0 < NA < 0.3$$

where NA is a numerical aperture of said lens.

16. A method for collimating a diverging light beam according to claim 15 wherein said lens meets a condition of $$\left| \frac{lopt}{f} - \frac{2-n}{n} + 0.05 \times \frac{3n-1-n^2}{(n-1)^2} (NA)^2 \right| < \frac{4 \times 10^{-4}}{(NA)^2}$$

where n is a refractive index of said lens, f is a focal distance thereof, and lopt is a distance between the origin point of divergence and the light input surface.

17. A method for collimating a diverging beam according to claim 15 further comprising a step of arranging an iris near said lens.

18. A condensing optical system for converting a parallel light beam to a light beam that converges onto a light receiving surface through a spherical lens, wherein said optical system meets the conditions of:

$$\left| \frac{lopt}{f} - \frac{2-n}{n} + 0.05 \times \frac{3n-1-n^2}{(n-1)^2} (NA)^2 \right| <$$

$$\frac{4 \times 10^{-4}}{(NA)^2} ; \text{ and; } 0 < NA < 0.3,$$

where n is a refractive index of said spherical lens, f is a focal distance thereof, NA is a numerical aperture thereof, and lopt is a distance between the light receiving surface and the end surface of said spherical lens.

19. A condensing optical surface for converting a parallel light beam to a light beam that converges onto a light receiving surface, said condensing optical system having a plane-parallel plate and spherical lens both of which are arranged in order from the light receiving surface, wherein said optical system meets the condition of:

$$\left| \frac{lopt}{f} - \frac{2-n}{n} - \frac{t}{f}\left(1 - \frac{1}{n_t}\right) + 0.05 \times \frac{3n-1-n^2}{(n-1)^2} (NA)^2 \right| < \frac{4 \times 10^{-4}}{(NA)^2}$$

$$0 < NA < 0.3$$

where n is a refractive index of said spherical lens, f is a focal distance thereof, NA is a numerical aperture thereof, lopt is a distance between the light receiving surface and an end surface of said spherical lens, $n_t$ is a refractive index of said plane-parallel plate, and t is a thickness thereof.

20. A condensing optical system for converting a parallel light beam to a converging light beam having a plane-parallel plate and spherical lens both of which are arranged in order from the origin point of convergence of said converging light beam, wherein said optical system meets the conditions of:

$$\left| \frac{lopt}{f} - \frac{2-n}{n} - \frac{t}{f}\left(1 - \frac{1}{n_t}\right) + 0.05 \times \frac{3n-1-n^2}{(n-1)^2} (NA)^2 \right| < \frac{4 \times 10^{-4}}{(NA)^2}$$

$$0 < NA < 0.3$$

where n is a refractive index of said spherical lens, f is a focal distance thereof, NA is a numerical aperture thereof, lopt is a distance between the origin point of divergence and an end surface of said spherical lens, $n_t$ is a refractive index of said plane-parallel plate, and t is a thickness thereof.

21. A method for converting a parallel light beam to a light beam that converges onto a light receiving surface comprising the steps of:

supplying the parallel light beam; and arranging a lens having a predetermined focal distance to receive the parallel light beam;

said lens having a light input surface and a light output surface both of which have a common center of curvature, and receiving said parallel light beam on said light input surface and emitting a converging light beam from said light output surface;

said light receiving surface being displaced from a focal point of said lens by a predetermined distance.

22. A method according to claim 21, wherein said lens meets a condition of:

$$0 < NA < 0.3$$

where NA is a numerical aperture of said lens.

23. A method according to claim 22, wherein said lens meets a condition of:

$$\left| \frac{lopt}{f} - \frac{2-n}{n} + 0.05 \times \frac{3n-1-n^2}{(n-1)^2} (NA)^2 \right| < \frac{4 \times 10^{-4}}{(NA)^2} ; \text{ and}$$

where n is a refractive index of said lens, f is a focal distance thereof, and lopt is a distance between the light receiving surface and said light input surface.

24. A method according to claim 22 further comprising a step of arranging an iris near said lens.

25. A method according to claim 24, wherein said iris is arranged to face said light output surface of said lens.

26. A method according to claim 21, wherein said lens has a predetermined refractive index and is made of homogeneous medium.

27. A method according to claim 26, wherein said lens is made of a single lens.

* * * * *

UNITED STATES PATENT AND TRADEMARK OFFICE
CERTIFICATE OF CORRECTION

PATENT NO. : 4,892,395

DATED : January 9, 1990

INVENTOR(S) : MASAYUKI SUZUKI ET AL.

It is certified that error appears in the above-identified patent and that said Letters Patent is hereby corrected as shown below:

COLUMN 2

Line 50, "(opt" should read --$\ell$opt--.

COLUMN 3

Line 12, "diverging angle" should read
        --divergence angle--.

COLUMN 4

Line 30, "$\Delta y=4,5\mu m$," should read --$\Delta y=4.5\mu m$,--.

COLUMN 5

Line 1, "$1=\ell opt+6$   (7)" should read --$1=\ell opt+\delta$   (7)--.
    Line 33, "$0.25\mu as$" should read --$0.25\lambda$ as--.
    Line 43, "of" should be deleted.

COLUMN 7

Line 15, "$(1-\tfrac{1}{2}n_t$   (11)" should read --$(1-_n\tfrac{1}{2}_t)$   (11)--.
    Line 19, "$(1-\tfrac{1}{2}n_2)$   (12)" should read --$(1-_n\tfrac{1}{2}_t)$   (12)--.
    Line 37, "6" should read --$\delta$--.

COLUMN 10

Line 7, "surface emitting" should read
        --surface and emitting--.
    Line 53, "image plate," should read --image plane,--.

UNITED STATES PATENT AND TRADEMARK OFFICE
CERTIFICATE OF CORRECTION

PATENT NO. : 4,892,395

DATED : January 9, 1990

INVENTOR(S) : MASAYUKI SUZUKI ET AL.

It is certified that error appears in the above-identified patent and that said Letters Patent is hereby corrected as shown below:

COLUMN 12

Line 11, insert Claim 20,
--A method for collimating a diverging beam according to Claim 17 wherein said iris being arranged to face the light output surface of said lens.--.

Line 21, "and;" should read --and--.

Line 28, "condensing optical surface" should read --condensing optical system--.

Line 33, "condition" should read --conditions--.

Signed and Sealed this

Twenty-first Day of July, 1992

Attest:

DOUGLAS B. COMER

*Attesting Officer*  *Acting Commissioner of Patents and Trademarks*